(12) United States Patent
Sherman et al.

(10) Patent No.: US 9,769,650 B1
(45) Date of Patent: Sep. 19, 2017

(54) SYSTEM AND METHOD FOR REDUCING PHONE RADIATION

(71) Applicants: Boaz Sherman, Liman (IL); Ofer Becker, Haifa (IL)

(72) Inventors: Boaz Sherman, Liman (IL); Ofer Becker, Haifa (IL)

(*) Notice: Subject to any disclaimer, the term of this patent is extended or adjusted under 35 U.S.C. 154(b) by 0 days.

(21) Appl. No.: 15/066,171

(22) Filed: Mar. 10, 2016

(51) Int. Cl.
*H04M 3/00* (2006.01)
*H04W 8/22* (2009.01)

(52) U.S. Cl.
CPC .................... *H04W 8/22* (2013.01)

(58) Field of Classification Search
CPC ......... H04W 68/00; H04W 4/12; H04W 8/22; H04W 8/245; H04W 24/02; H04W 88/02; H04W 8/26; H04M 1/72525
USPC .................................................. 455/418–420
See application file for complete search history.

(56) References Cited

U.S. PATENT DOCUMENTS

| | | | |
|---|---|---|---|
| 7,787,821 B2 | 8/2010 | Hamaguchi | |
| 8,886,229 B2 * | 11/2014 | Nanda ..................... | G01D 21/00 370/310.2 |
| 2002/0009976 A1 | 1/2002 | Rashidi | |
| 2002/0055336 A1 | 5/2002 | Hong | |
| 2002/0098840 A1 * | 7/2002 | Hanson ................... | H04L 67/40 455/435.3 |
| 2006/0160562 A1 * | 7/2006 | Davis ..................... | H04M 1/673 455/550.1 |
| 2009/0305742 A1 * | 12/2009 | Caballero ............ | H04B 1/3838 455/566 |
| 2010/0093342 A1 * | 4/2010 | Ramachandra Rao .................... | H04M 15/00 455/432.1 |
| 2011/0065375 A1 * | 3/2011 | Bradley ............. | H04M 1/72577 455/1 |
| 2012/0309382 A1 * | 12/2012 | Dugan ................... | H04W 4/001 455/422.1 |
| 2013/0035142 A1 | 2/2013 | Wolf, II | |
| 2014/0066038 A1 * | 3/2014 | Sane .................. | H04W 52/0274 455/418 |
| 2014/0335823 A1 * | 11/2014 | Heredia .............. | H04L 12/5895 455/411 |
| 2014/0351832 A1 * | 11/2014 | Cho ....................... | H04L 67/141 719/328 |
| 2014/0359793 A1 * | 12/2014 | Dobson ............... | G06F 21/6245 726/30 |

(Continued)

*Primary Examiner* — Kathy Wang-Hurst
*Assistant Examiner* — B. M. M Hannan
(74) *Attorney, Agent, or Firm* — Browdy and Neimark, PLLC

(57) ABSTRACT

Techniques for reducing emission of electromagnetic radiation from a cellular communication device are disclosed. Upon determining fulfillment of a defined condition or event, operation of a cellular communication unit of the cellular communication device is at least partially deactivated, and a deactivation notification is sent to at least one another preselected cellular communication device through either the cellular communication unit or an alternative communication channel, to inform that cellular communication of the cellular communication device has been disabled. Cellular communication of the device can be restored upon receiving, through the alternative communication channel, an activation request from the at least one other preselected cellular communication device, and responsively changing the state of the cellular communication unit into its active state.

30 Claims, 5 Drawing Sheets

(56) References Cited

U.S. PATENT DOCUMENTS

| | | | |
|---|---|---|---|
| 2015/0245197 A1* | 8/2015 | Lee | H04W 8/205 455/418 |
| 2016/0066273 A1* | 3/2016 | Prats | H04W 52/0229 370/311 |
| 2016/0088151 A1* | 3/2016 | Dai | H04M 3/42374 455/414.1 |
| 2016/0127550 A1* | 5/2016 | Golan | H04W 4/16 455/414.1 |
| 2017/0094597 A1* | 3/2017 | Su | H04W 52/0209 |

* cited by examiner

SYSTEM AND METHOD FOR REDUCING PHONE RADIATION

TECHNOLOGICAL FIELD

The present invention relates to techniques and applications for limiting and controlling the emission of electromagnetic radiation from cellular phone devices.

BACKGROUND

The use of mobile communication services is rapidly increasing over the years, and this growth is expected to continue for the foreseeable future with the introduction of new mobile phone technologies. It is in fact common now for almost any adult and youngster to own a cellular phone device capable of managing a plethora of daily operations and activities, in addition to the conventional audio/voice telephony communication functionality of the device. For example, almost any cellular phone device provides, nowadays, events scheduling and alert applications, text messaging services, date/time displays and alarm clock functionalities. It is thus common that the cellular telephone devices are constantly maintained in the vicinity of their users, even during time periods wherein the device is not being used e.g., when recharging the battery pack of the device and/or during the night time when the user is asleep.

However, cellular telephone devices transmit electromagnetic radiation, even when not being used, as they are required to identify the closest base stations and monitor communication therewith. Cellular telephone devices use electromagnetic radiation in the microwave range (450-2100 MHz), which have been classified as being possibly carcinogenic (Group 2B, International Agency for Research on Cancer—IARC, 2011) i.e., carcinogenicity risks can exist. It is known that part of the radiation emitted by mobile telephone devices is absorbed by the human body, which has a cumulative effect that is not yet fully understood.

In most cellular telephony systems the cellular phone device and the base stations check reception quality and signal strength using signaling schemes wherein the power level of the transmitted signals is progressively increased or decreased automatically within certain spans, to accommodate different situations, such as inside or outside of buildings and vehicles. In addition, data communication between the cellular phone devices and the base stations is performed in a continuous manner over predefined control channels for exchanging information therebetween (e.g., registration, origination, and paging).

Possible solutions known from the patent literature for reduction of electromagnetic radiation emission from cellular phone devices are briefly described hereinbelow.

US Patent Publication No. 2002/055336 describes an antenna module for a cellular phone which is capable of minimizing the effect of electromagnetic radiation of the cellular phone on the human body and enhancing the quality of speech of the cellular phone. The antenna module comprises two helix antennas installed in the cellular phone transversally apart from each other, and a power supply unit connected to the helix antennas for applying two power signals with the same power level and opposite phases respectively to the helix antennas. This antenna module is able to radiate a minimized amount of electromagnetic waves in the longitudinal direction of the cellular phone, or toward either the top or rear part of the cellular phone, and an increased amount of electromagnetic waves in the transversal direction of the cellular phone, respectively, thereby minimizing electromagnetic radiation to the human body while at the same time enhancing the quality of speech of the cellular phone.

US Patent Publication No. 2002/009976 describes a radiation-protection device for cellular telephones using a radiation-resistant protective panel between the cellular telephone and the head of the person using the telephone. This protective panel may be mounted directly on the telephone. It may be mounted directly upon the case in which the telephone is housed or may be a portion of the case which is swung up into position between the telephone antenna and the user's head when the telephone is in use.

US Patent Publication No. 2013/035142 describes a radiation shield that comprises a substrate polymer layer, a conductive layer having an aperture providing access to a front face of a cellular telephone, adjacent the substrate polymer layer, and an adhesion surface adjacent the conductive layer and the front face. At least one opening is provided for accessing the front face of the cellular telephone.

A power saving solution designed for information terminals in described in U.S. Pat. No. 7,787,821, wherein an information terminal device uses a first radio communication unit capable of performing radio communication with low power consumption and a second radio communication unit performing data communication using a wireless LAN. In an ad-hoc mode in which data communication is performed between the terminals, as a rule, the second radio communication unit is set in a sleep mode. However, when actual data communication is necessary, an activation signal is transmitted to a terminal as a communication party by using the first radio communication unit to activate the second radio communication unit. After completion of data communication, a stop signal is transmitted to the terminal as the communication party by using the first radio communication unit to stop the second radio communication unit on the transmission side. In such a manner, transmission of a beacon signal from the second radio communication unit is suppressed, and proper power saving is realized.

General Description

Cellular phone devices are required during their operation to guarantee that communication is being continuously maintained with base stations of the cellular network, and therefore emit electromagnetic radiation also when not being used to communicate audible and/or other information/data. This means that users are regularly exposed to electromagnetic radiation emitted from their cellular phone devices throughout day and night, and in a majority of cases during the entire 24 hours of the day. Most attempts to reduce a user's exposure to electromagnetic radiation emitted from their cellular phone devices involved adding shielding means, or use of certain antenna configurations, designed to attenuate the amount of electromagnetic radiation emitted from the cellular phone device in the direction of the user.

There is a need in the art for techniques for limiting and controlling the radiation emitted from any (on the shelf) cellular phone, without requiring special shielding and/or hardware modifications. In a broad aspect the present invention provides techniques for limiting and controlling the electromagnetic radiation emitted from a cellular phone device by selectively deactivating the cellular communication (transceiver) unit of the device, and activating it to permit cellular communication when it is specifically needed by the user and/or by predefined entities/contact persons e.g., emergency or other high importance telephone communication.

For this purpose the inventors hereof developed a communication control scheme designed to enable cellular mobile devices to selectively switch the state of the cellular communication unit of a user's cellular phone device between its active and inactive states, and notify one or more cellular phone devices of selected entities/contacts of at least the switching of the user's cellular phone device into the inactive state. The communication control scheme is further designed to provide the cellular devices of the notified entities/contacts one or more options to send, upon need, via alternative communication channels (e.g., using WLAN, WiFi, Satellite communication—SATCOM, etc.), a request to switch the cellular communication unit of the user's cellular mobile device into an active state for allowing them to initiate cellular communication therewith (referred to herein as activation request).

This communication control scheme is implemented in some embodiments by means of a communication manager module installed in the user's cellular mobile device, and configured to allow the user to specify selected entities/contact persons, to selectively deactivate the cellular communication unit of the phone device whenever certain predetermined conditions/events are satisfied (e.g., when the device is being charged at night), or upon receiving a deactivation input from the user. Optionally, and in some embodiments preferably, the communication manager module notifies the selected contacts (e.g., over any suitable communication channel, such as but not limited to, the cellular network, WLAN/Internet/WiFi, SATCOM, etc.) at least that the cellular communication unit of the user's device been switched into an inactive mode i.e., cellular communication is temporarily being disabled (hereinafter also referred to as deactivation notification).

Optionally, and in some embodiments preferably, the communication manager module is further configured to notify the cellular mobile device of the selected contacts when the cellular communication unit is being switched from the inactive state into the active state (hereinafter also referred to as activation notification). The deactivation and activation notifications may be carried out using any suitable predetermined signaling scheme that can be received and correctly interpreted by the cellular devices of the selected contacts.

In some embodiments a call manager module is installed in the cellular mobile device of the selected contacts for managing the notifications received from the user's cellular mobile device, and for managing outgoing telephone call events initiation. The call manager module is preferably configured to receive the deactivation and activation notifications from the user's cellular phone device and enable the user to send activation requests to the user's cellular mobile device whenever cellular communication therewith is required.

One inventive aspect of the subject matter disclosed herein relates to a cellular communication system capable of establishing cellular communication between a plurality of cellular communication devices (e.g., cellular phone devices) over a cellular communication network. The cellular communication system is configured to enable end users control over emission of electromagnetic radiation from their cellular communication devices. Each of the plurality of cellular communication devices comprises a cellular communication unit connectable to the cellular communication network, and a wireless data communication unit (e.g., WLAN, SATCOM) connectable to a data network (e.g., the Internet), and a control unit configured and operable to operate the cellular communication device. A communication manager module installed in the cellular communication device is configured and operable to selectively deactivate, at least partially, operation of the cellular communication unit upon fulfillment of defined events or conditions (e.g., defined by a user), and to send a deactivation notification, through at least one of the cellular and wireless data communication units, to at least one another preselected cellular communication device of the plurality of cellular communication devices, to inform the at least partial deactivation of its cellular communication unit.

In some embodiments, the communication manager module is configured and operable to activate the cellular communication unit whenever cellular communication therewith is required, and to send an activation notification to the at least one other preselected cellular communication device through at least one of the cellular and wireless data communication units.

Preferably, in some embodiments, the control unit of the at least one other preselected cellular communication device comprises a call manager module configured and operable to receive and process the deactivation notification and responsively intercept and halt attempts to initiate cellular communication with the cellular communication device whose cellular communication unit been at least partially deactivated. The call manager module is also configured and operable to send to the cellular communication device whose cellular communication unit been at least partially deactivated, an activation request via its wireless data communication unit to request activation of the cellular communication unit whenever cellular communication therewith is required. Accordingly, the communication manager module is further configured and operable to receive and process the activation request and responsively activate its cellular communication unit.

The communication manager module is further configured and operable to send an activation notification to the call manager module through at least one of the cellular and wireless data communication units to inform that its cellular communication unit is being activated. The call manager module is configured and operable to receive and process the activation notification and responsively release the intercepted attempts for cellular communication initiation.

Optionally, and in some embodiments preferably, the deactivation of the cellular communication unit is responsive to an input from the user of the communication device. The at least partial deactivation can comprise deactivating a cellular transmitter of the cellular communication unit, or deactivating the cellular transmitter and cellular receiver of the cellular communication unit.

Optionally, the wireless data communication unit is configured to communicate data over a satellite communication channel.

Another inventive aspect of the subject matter disclosed herein relates to a method of reducing emission of electromagnetic radiation from a cellular communication device having a cellular communication unit and a wireless communication unit. The method comprises deactivating, at least partially, operation of the cellular communication unit responsive to fulfillment of a defined condition or event, sending a deactivation notification to at least one other preselected cellular communication device through at least one of the communication units to inform that cellular communication of the cellular communication device been disabled, and receiving through the wireless communication unit an activation request from the at least one other preselected cellular communication device, and responsively activating the cellular communication unit.

In some embodiments, the method further comprises sending an activation notification to the at least one other preselected cellular communication device, upon, or shortly after, activating cellular communication unit of the cellular communication device. In this case, cellular communication is then established with the at least one other preselected cellular communication device.

In possible applications, the method comprises receiving inputs from a user of the cellular communication device for defining the condition or event. Optionally, the defined event is a user input indicating that deactivation of the cellular communication unit is required by a user of the device.

The sending of the deactivation notification comprises in some embodiments including in the deactivation notification instructions for the at least one other preselected cellular communication device about how to restore cellular communication with the cellular communication device.

In a variant, the method comprises receiving from a user of the cellular communication device selected contacts, wherein the at least one other preselected cellular communication device is a cellular communication device of at least one of said selected contacts. In some embodiments an enrollment invitation is sent to cellular communication devices of the selected contacts informing them about their selection by the user. Optionally, and in some embodiments preferably, the enrollment invitation is configured to cause installation of a call manager module in the cellular communication devices of the selected contacts, and the call manager module is configured to receive the deactivation notification and send the activation request through the wireless communication unit.

Optionally, the method comprises receiving from the user priority indications for at least one of the selected contacts, and deciding whether to activate the cellular communication unit based on the priority indications. In possible embodiments, the call manager module is configured to include in the activation request a priority indication, and the method can thus comprise deciding whether to activate the cellular communication unit based on the priority indication.

Yet another inventive aspect of the subject matter disclosed herein relates to a computer application configured and operable to reduce emission of electromagnetic radiation from a cellular communication device having a cellular communication unit and a wireless communication unit, by carrying out the following operations: deactivating, at least partially, operation of the cellular communication unit responsive to fulfillment of a defined condition or event, sending a deactivation notification to at least one other preselected cellular communication device through at least one of the communication units to inform that cellular communication of the cellular communication device has been disabled, and receiving through the wireless communication unit an activation request from the at least one other preselected cellular communication device, and responsively activating the cellular communication unit.

Preferably, the computer application is further configured and operable to send an activation notification to the at least one other preselected cellular communication device, upon, or shortly after, activating the cellular communication unit. Optionally, the computer application is further configured and operable to receive inputs from a user of the cellular communication device for defining the condition or event.

In some embodiments the computer application is configured and operable to include, in the deactivation notification, instructions for the at least one other preselected cellular communication device about how to restore cellular communication with the cellular communication device.

Optionally, and in some embodiments preferably, the computer application is configured and operable to receive from a user of the cellular communication device selected contacts, and to send the deactivation notification to a cellular communication device of at least one of said selected contacts. Optionally, the computer application is configured and operable to receive, from the user, priority indications for at least one of the selected contacts, and to decide whether to activate the cellular communication unit based on said priority indications.

Optionally, and in some embodiments preferably, the computer application is configured and operable to send to cellular communication devices of the selected contacts an enrollment invitation informing about their selection by the user. The enrollment invitation can be configured to cause installation of a call manager module in the cellular communication devices of the selected contacts for receiving the deactivation notification and for sending the activation request through the wireless communication unit.

BRIEF DESCRIPTION OF THE DRAWINGS

In order to understand the invention and to see how it may be carried out in practice, embodiments will now be described, by way of non-limiting example only, with reference to the accompanying drawings. Features shown in the drawings are meant to be illustrative of only some embodiments of the invention, unless otherwise implicitly indicated. In the drawings like reference numerals are used to indicate corresponding parts, and in which:

FIGS. 1A and 1B are block diagrams schematically illustrating communication control schemes according to possible embodiments, wherein FIG. 1A shows a communication control scheme configured to enable deactivation of cellular communication of phone devices and FIG. 1B shows a communication control scheme further configured to allow preselected entities/contacts to restore cellular communication with phone devices on which cellular communication was deactivated;

DETAILED DESCRIPTION OF EMBODIMENTS

Figure 1A:
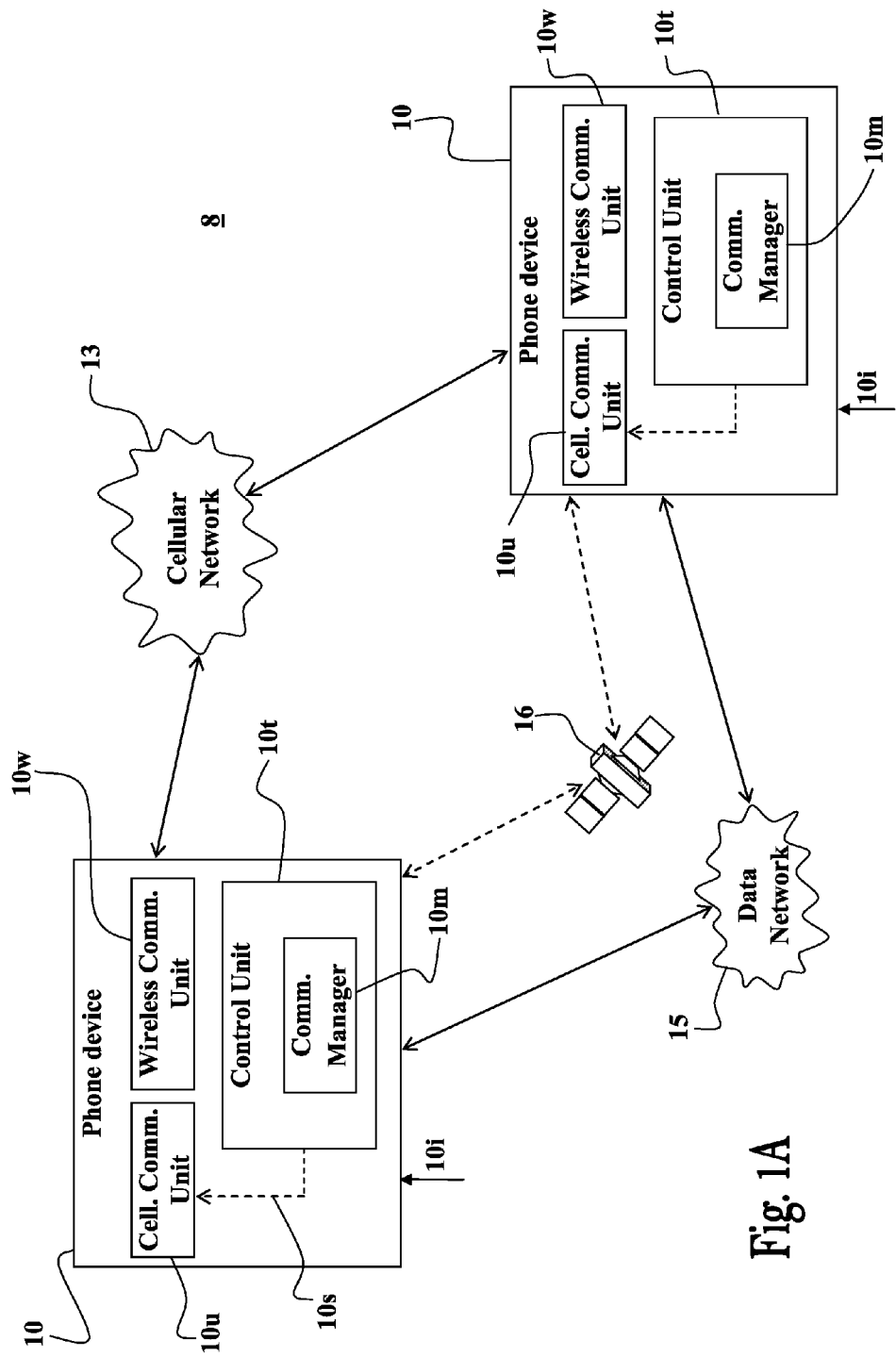

One or more specific embodiments of the present disclosure will be described below with reference to the drawings, which are to be considered in all aspects as illustrative only and not restrictive in any manner. In an effort to provide a concise description of these embodiments, not all features of an actual implementation are described in the specification. Elements illustrated in the drawings are not necessarily to scale, emphasis instead being placed upon clearly illustrating the principles of the invention. This invention may be provided in other specific forms and embodiments without departing from the essential characteristics described herein.

The present invention provides a communication control scheme designed to limit and control emission of electromagnetic radiation from a cellular phone device, to which the user carrying the device is exposed, by selectively deactivating the cellular communication unit of the cellular phone device whenever predefined conditions/events are satisfied. Although the embodiments described below are specifically directed to cellular phone devices, it is clear that the invention is not restricted to cellular phone devices, and in fact may be implemented in any device having cellular communication abilities (e.g., tablets, laptops, navigation systems, personal assistance devices—PDAs, and suchlike).

In preferred embodiments, the predefined deactivation conditions are defined to identify time periods during which the cellular communication functionality of the device is not necessarily required, such as when the user is asleep. For example, during night time, when the user goes to sleep, the cellular phone device is usually placed in the vicinity of the user within a hand reach distance. During these time periods the cellular communication functionalities of the cellular phone device are typically not used, but the phone device still emits harmful electromagnetic radiation, as it is required to maintain continuous cellular communication/registration with the closest base station of the cellular network. Turning the cellular phone off, or switching it into "flight mode", will prevent anyone from contacting the user in emergency cases, and is therefore not a practical solution.

A deactivation notification sent from the user's cellular phone device to cellular phone devices of one or more specific contact persons preselected by the user is used to inform the preselected contact persons that the user's phone device cannot be communicated over the cellular network. The cellular phone devices of the preselected contact persons are adapted to allow transmission of activation requests to the user's cellular phone device, over an alternative communication channel, in case an important/emergency telephone call with the user is needed. The activation requests are received and processed by the user's cellular phone device and can cause switching of the cellular communication unit of the user's cellular phone device into its active state to allow initiation of the important/emergency telephone call over the cellular network.

For this purpose, the user's cellular phone device sends an activation notification to at least the cellular phone device of the contact person from which the activation request was sent to inform that the cellular communication unit been activated in the user's cellular phone device, and that cellular communication can be conducted therewith. Optionally, in possible embodiments, the user's cellular phone device sends the activation notification to the cellular phone devices of all of the preselected contact persons. The activation notification can be sent from the user's cellular phone device over the cellular network, and/or over the alternative communication channel used to transmit the activation request.

In some embodiments, the alternative communication channel is established by means of the WLAN (such as wireless fidelity—WiFi, ZigBee, ANT, and suchlike) connectivity, typically having substantially low power characteristics (~100 mW), and used to communicate at least the activation requests from the cellular phone devices of the preselected contact persons to the user's cellular phone device for switching its cellular transmission unit into its active state. However, in some embodiments, the WLAN connectivity of the cellular phone devices is also used to communicate at least one of the deactivation notifications and activation requests.

To this end, it should be noted that in possible embodiments only the cellular transmission unit of the user's cellular phone device is switched between its active and inactive states for controllably limiting exposure of the user to electromagnetic radiation emitted from the phone device (i.e., the cellular receiver unit remains in its active state). Thus, in such embodiments the user's mobile device is capable of receiving information transmitted over to the control channels by the base stations, but unable to exchange registration, origination, and paging data therewith. However, switching the entire cellular functionality of the phone device is found to be preferable in some embodiments due to power consumption reduction achieved by preventing reception and processing of the control channels information by the user's cellular phone device.

As exemplified in the non-limiting example shown in the figures and described hereinbelow, some, or all, of the activation/deactivation notifications and/or activation requests can be transmitted over the Internet, or any other data/computer network, using the WLAN connectivity of the cellular phone devices. However, other alternative communication channels may be similarly used.

FIG. 1A exemplifies a communication control scheme of some embodiments configured to enable deactivation of cellular communication of cellular phone devices 10. The cellular communication system 8 shown is capable of establishing cellular communication between a plurality of cellular mobile phone devices 10 over the cellular communication network 13, while enabling end users to control the time periods in which electromagnetic radiation is being emitted from their cellular phone devices. Each cellular phone device 10 comprises a cellular communication unit 10u connectable to the cellular communication network 13, a wireless communication unit 10w connectable to a data/computer network 15 (e.g., the Internet), and a control unit 10t configured and operable to operate the cellular phone device 10 and generate control signals 10s to deactivate its cellular communication unit 10u according to a user's defined events and/or conditions. The control unit 10t is further configured to send a deactivation notification, via at least one of the cellular and wireless data communication units, to at least other one cellular phone device, to inform of deactivation of its cellular communication unit 10u.

In some embodiments the control unit 10t comprises a communication manager module 10m configured and operable to selectively deactivate the cellular communication unit 10u according to the events and/or conditions defined by the user of the device. The communication manager module 10m is preferably further configured and operable to send the deactivation notification, via at least one of said cellular and wireless data communication units, to the at least other one of the cellular phone devices, to inform of deactivation of its cellular communication unit 10u.

Optionally, and in some embodiments preferably, the control unit 10t, and/or its communication manager module 10m, is configured and operable to switch the cellular communication unit 10u into its inactive state upon receiving a user input 10i (e.g., push button).

To this end, it is known that communication over the cellular network 13 requires the cellular phone device 10 to connect to a Base Station (BS—located at a corner of a cell, not shown in the figures), which connects the cellular phone device 10 to a mobile switching center (MSC, also not shown) that provides connection to the public switched telephone network (PSTN, also not shown). The details of the uplink (from the cellular phone device to the BS) and the downlink (from the BS to the cellular phone device) connectivity are however not described herein, and not shown in the figures, for the sake of simplicity and brevity.

As also seen in FIG. 1A, in possible embodiments the wireless communication unit 10w is configured and operable to communication over a satellite communication channel (designated by dashed arrowed lines), which may be used for sending notifications and/or requests between the cellular phone devices 10 when cellular communication of at least one of these phone devices is disabled.

In the following non-limiting examples the WLAN (shown in FIG. 1B) connectivity of the cellular phone devices 10 is used as the alternative communication channel of the phone device. It is however noted that any other alternative communication channel (e.g., satellite communication—SATCOM) can be similarly used for this purpose. As exemplified in the figures, the WLAN connectivity typically requires Internet connectivity to establish point to point communication between the cellular mobile devices 10, but of course any other data or computer network (e.g., using TCP/IP based communication) can be similarly used.

Figure 1B:
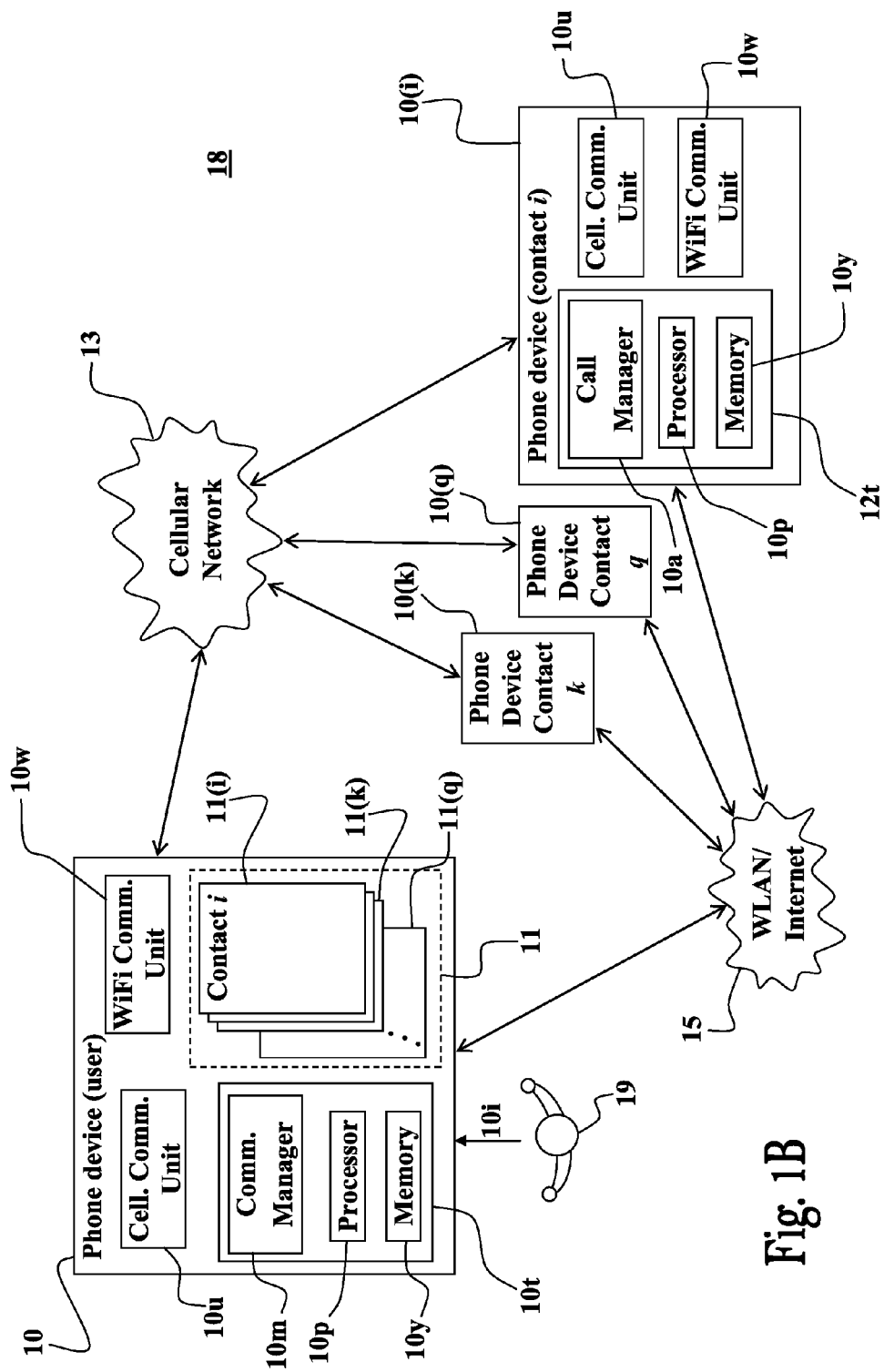

FIG. 1B schematically illustrates a communication control scheme according to some possible embodiments. The communication system 18 is configured to reduce user's exposure to electromagnetic radiation emitted from its cellular telephone device 10 during selected time durations (such as when charging the device during night time). The communication control features are enforced in the user's cellular phone device 10 by the communication manager module 10m configured to switch the cellular communication unit 10u of the phone device 10 between its active and inactive states, when needed. The communication manager module 10m may be installed in the cellular phone device 10 by the user 19, or it may be included in the device firmware as part of the manufacturer default device settings. For example, and without being limiting, the communication manager module 10m may be implemented as a software application executed by means of processor 10p and memory 10y of the control unit 10t of the cellular phone device 10. It is however noted that a hardware implementation of the communication manager module 10m may be also/alternatively used.

The communication manager module 10m is configured in some embodiments to allow the user 19 to specify selected contact persons/entities from the contacts dataset 11 maintained by the user in the cellular phone device 10. The communication manager module 10m is further configured to send to the contacts 11(i), 11(k) and 11(q), selected by the user an enrollment invitation (e.g., by email and/or short message service—SMS), to enable them to exploit the communication control scheme. This can be achieved by installing in the cellular phone devices 10(i), 10(k) and 10(q), of the selected contact persons, a call manager module 10a configured to allow them to send to the user's phone device 10 activation requests during the time periods in which its cellular communication module 10u is switched into the inactive state.

The call manager module 10a may be implemented as a software application executed by means of processor 10p and memory 10y of the control unit 10t of the cellular phone devices 10(i), 10(k) and 10(q), of the selected contact persons. Optionally, the call manager module 10a is included in the phone device firmware as part of the manufacturer default device settings. It is however noted that a hardware implementation of the call manager module 10a may be also/alternatively used.

In some embodiments, the communication manager module 10m is configured to send to the cellular phone devices 10(i), 10(k) and 10(q), of the selected contact persons installable software of the call manager module 10a, and/or a network link for downloading and installing the call manager module 10a. After installing and activating the call manager module 10a in the cellular phone devices 10(i), 10(k) and 10(q), of the selected contact persons, their phone devices are allowed to send requests for initialization of important/emergency cellular communication with the user's cellular phone device 10 (i.e., activation requests).

In some embodiments, the communication manager module 10m is configured to receive from the user 19 predefined conditions and/or events for deactivating the cellular communication unit 10u of the phone device 10 (hereinafter also referred to as deactivation conditions). For example, and without being limiting, the user may define certain time ranges during the day (e.g., sleep times such during the night), in which the cellular communication unit 10u should be deactivated. As another non-limiting example, the user may define events associated with the operation of the mobile phone, such as, but not limited to, when the phone device is being charged and/or when certain applications of the device are in use by user 19 (e.g., eLearning applications, and/or certain games), and/or when watching online content (e.g., movies or TV shows), and/or when using the phone to shoot a video, as time periods in which the cellular communication unit 10u should be deactivated. As yet another non-limiting example, the user may indicate certain events scheduled in the calendar of the phone device 10 (e.g., meetings, game/sport/social events, etc.) during which the cellular communication unit 10u should be deactivated.

It is noted that deactivating the cellular communication unit 10u when running applications that utilize substantial communication and/or processing resources of the phone device (e.g., video streaming) will improve the device performance and user functionality control. For instance, incoming phone calls typically disrupt and slow down data communication, and can even hamper data transfer, which can be prevented by deactivating the cellular communication unit 10u.

The communication manager module 10m is therefore further configured in some embodiments to monitor and identify fulfillment of the conditions and/or events specified by the user 19, and switch the cellular communication unit 10u into the inactive state accordingly. Optionally, and in some embodiments preferably, the communication manager module 10m is configured to deactivate the cellular communication unit 10u upon receiving a respective input indication 10i from the user 19 e.g., by a push button.

Before (or shortly after) deactivating the cellular communication unit 10u of the user's cellular phone device 10, the communication manager module 10m sends to the preselected contact persons (11(i), 11(k) and 11(q)) a deactivation notification. The deactivation notification may be transmitted to the phone devices 10(i), 10(k) and 10(q), of the selected contact persons over the cellular network 13 (e.g., in SMS message and/or using predefined communication protocol signals), and/or over the WLAN (and Internet) 15 (e.g., by text messaging and/or using predefined TCP/IP packets). The call manager modules 10a in the cellular phone devices of the selected contact persons are configured to receive the deactivation notification and intercept any attempt to initiate cellular communication with the cellular phone device 10 of the user 19 during the time period which its cellular communication is disabled.

When the call manager modules 10a of the cellular phone device 10(i) intercepts attempt of a preselected contact person (11(i)) to initiate cellular communication with the cellular phone device 10 of the user 19, it sends an activation request notification to the user's phone device over the WLAN. The communication manager module 10m is configured to receive and process the activation requests and determine accordingly if the cellular communication unit 10*u* should be activated. If it is determined that the cellular communication unit 10*u* should be activated, the communication manager module 10*m* switches the cellular communication unit 10*u* into its active state and sends an activation notification to at least the phone device 10(*i*) from which the activation request originated, or optionally, to the phone devices 10(*i*), 10(*k*) and 10(*q*), of all of the preselected contact persons (11(*i*), 11(*k*) and 11(*q*)). The activation notification may be sent from the user's phone device 10 over the cellular network 13 (e.g., in SMS message and/or using predefined communication protocol signals), and/or over the WLAN (and Internet) 15 (e.g., by text messaging and/or using predefined TCP/IP packets).

In some embodiments, the communication manager module 10*m* is configured to automatically switch the cellular communication unit 10*u* of the user's cellular phone device 10 into the active state upon receiving the activation request, and send the respective activation notification. However, in some other possible embodiments the communication manager module 10*m* is configured to determine priorities of the received activation requests and based thereon determine if the cellular communication of the user's cellular phone device 10 should be restored i.e., whether to switch the cellular communication unit 10*u* into its active state.

For example, and without being limiting, the user 19 may define certain contact persons to have higher priority (e.g., family of the user) than other contact persons in the group of preselected contact persons. Optionally, the activation requests sent from the cellular phone devices 10(*i*), 10(*k*) and 10(*q*), may be adapted to include a priority indication (e.g., most urgent, urgent, not urgent) defined by the contact person via the call manager module 10*a*, and the communication manager module 10*m* can be accordingly configured to process the priority indications included in the activation requests and based thereon, and/or other factors, and/or respective user settings, determine whether to restore cellular communication of the device 10.

Upon receipt of the activation notification from the cellular phone device 10 of the user 19, the call manager module 10*a* releases the intercepted call attempt and allows initiation of cellular communication (e.g., SMS, voice/video call) between the cellular phone devices of the user 19 and of the respective contact person requesting it.

Optionally, and in some embodiments preferably, the call manager module 10*a* displays a respective indication on the display of the phone device 10(*i*) of the preselected contact person (and/or provides any other audio and/or visual indication) when it sends the activation request to the phone device 10 of the user 19, to indicate that a process for activation of the cellular communication module of the user's phone device 10 is currently carried out. Similarly, a notification can be displayed (and/or any other audio and/or visual indication) once the activation request is received and a decision to restore cellular communication has been reached, for indicating that cellular communication is being restored to receive a telephone call from the specific preselected contact person (11(*i*)). Optionally, a "false" audible ring indication may be played on the phone device of the user, and/or of the preselected contact person, until the cellular communication between the devices is established, to notify the user(s) that the phone call is about to take place.

In some embodiments the communication manager module 10*m* is configured to switch the cellular communication unit 10*u* into the inactive state immediately after cellular communication with the contact person has ended. Optionally, the communication manager module 10*m* is configured to check if the deactivation conditions are still satisfied before deactivating the cellular communication unit 10*u* of the cellular phone device 10. Optionally, the communication manager module 10*m* is configured to switch the cellular communication unit 10*u* into the inactive state only after receiving a respective input indication 10*i* from the user 19 to do so.

The communication control schemes of FIGS. 1A and 1B, described hereinabove, can be used to design cellular communication systems configured to provide the cellular phone devices used therein improved abilities to limit and control electromagnetic radiation emission from the cellular phone devices 10, and reduce users' exposure thereto. In preferred embodiments, the cellular communication systems 8/18 utilizes conventional existing cellular and/or land line, and/or satellite, telephony infrastructures without altering their structures and operation schemes.

For example, and without being limiting, a cellular communication system according to possible embodiments comprises a plurality of cellular mobile phone devices 10, a cellular communication network 13 capable of establishing data and/or voice communication between the phone devices, a data/computer network 15 capable of establishing point-to-point data communication between the phone devices, wherein each of the phone devices is configured to switch its cellular communication unit when cellular communication is not needed, and selectively notify at least one other phone device that cellular communication with the phone device been disabled, so as to allow said at least one other phone device to request over the data network that the cellular communication unit of the phone device be switched into its active state when cellular communication therewith is required (e.g., in case of high importance or emergency).

Figure 2:
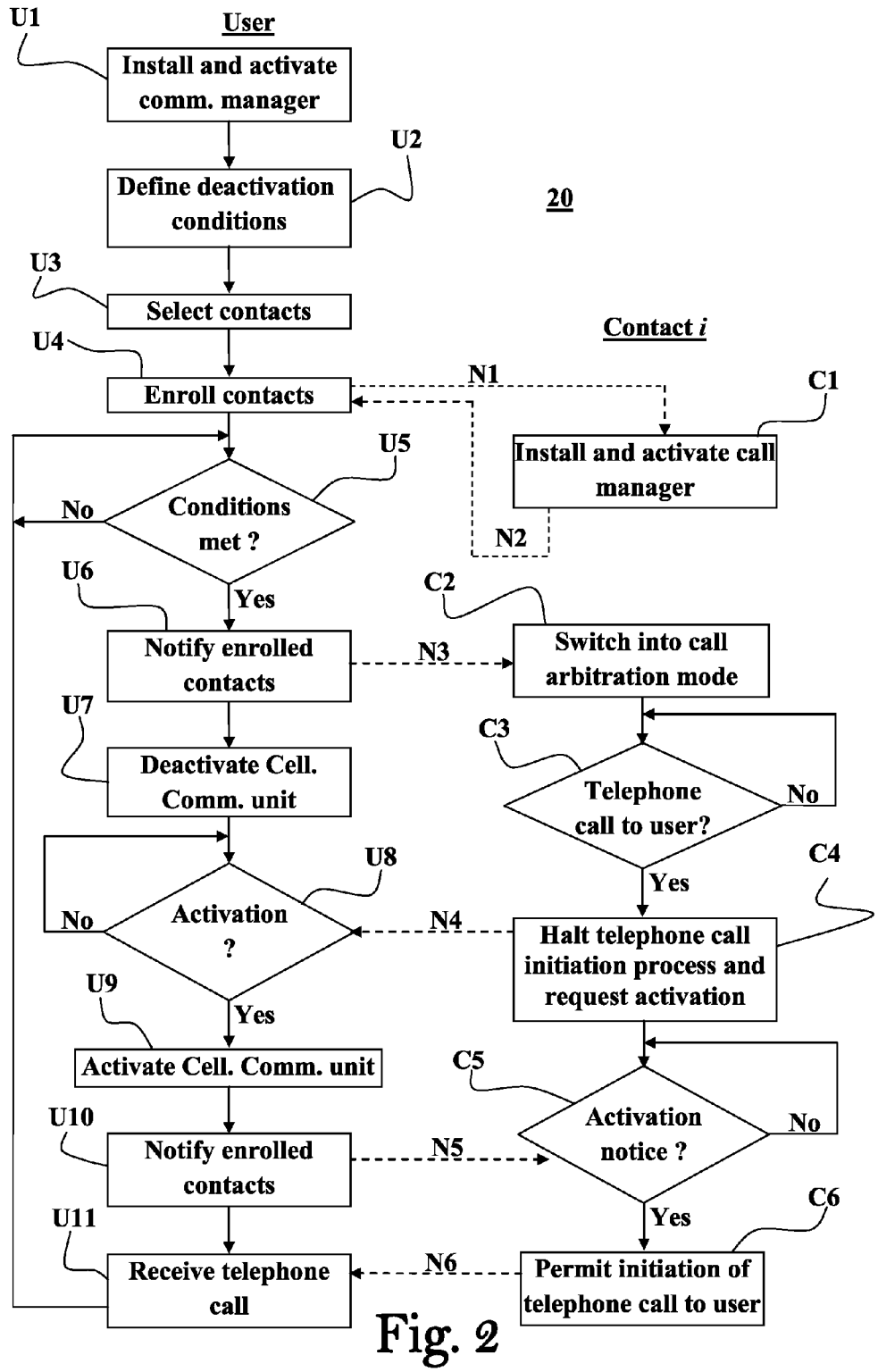
FIG. 2 is a flowchart schematically illustrating operation of the communication control scheme according in a possible embodiment.

FIG. 2 is a flowchart demonstrating processes involved in the construction and operation of the communication control scheme illustrated in FIG. 1B, using existing cellular telephony and data communication (the Internet) infrastructures, normally used by cellular phone devices. The process starts in step U1 by installing and activating in the user's cellular phone device (10) the communication manager module (10*m*). The communication manager module software may be downloaded via any suitable communication channel (e.g., via the cellular network 13 or the Internet 15 via the WLAN connectivity of the phone device), or optionally, may be pre-installed in the cellular phone devices, or integrated into their firmware and/or hardware.

In step U2 the user (19) may define in the communication manager module (10*m*) events and/or conditions upon which the communication manager module should switch the cellular communication unit (10*u*) into the inactive state. Step U2 may be carried out when the communication manager module is activated in the cellular phone device for the first time, and/or during installation of the communication manager module, and/or at any other suitable time upon a user's request/need to define deactivation events/conditions. Step U2 may include permitting access of the communication manager module (10*m*) to the user's calendar application, and/or any other event scheduling application, to allow it to deactivate the cellular communication unit of the phone device during certain events scheduled therein. Additionally, or alternatively, in some embodiments the cellular communication unit (10*u*) is deactivated upon receipt of a respective user input (10*i*, e.g., push button) from the user, and in such implementations step U2 is not needed and thus may be removed.

In step U3 the user (19) specifies one or more contact persons/entities from the contacts dataset (11) of the phone device (10), selected for submission of activation and deactivation notifications by the communication manager module (10*m*), and in step U4 the communication manager module sends to the selected contacts/entities the user specified enrollment invitations N1 (e.g., by email and/or SMS). The enrollment invitation N1 may include the call manager module software (10*a*), or a link to a network location from which the call manager module software can be downloaded and installed. In step C1 the call manager module software is installed and activated in the cellular phone devices that received the enrollment invitations N1 upon permission of their respective entities/contact persons (referred to herein as enrolled contacts). When the call manager module (10*a*) is activated for the first time in one of the cellular phone devices (10(*i*)), the call manager module sends an enrollment confirmation N2 to the cellular phone device (10) from which the enrollment invitation N1 has been received (e.g., over the same communication channel of the enrollment invitation N1, or over an alternative communication channel).

If further enrollment invitations (N1) are received in the cellular phone device (10(*i*)) of the selected entity/contact person from cellular phone devices of other users, there is of course no need to install again the call manager module software therein. In this case the already installed call manager module (10*a*) processes and registers the newly received enrollment invitations, and sends to the respective cellular phone devices enrollment confirmations (N2).

In step U5 the communication manager module (10*m*) determines if any of the deactivation conditions/events defined by the user are satisfied. In some embodiments step U5 is performed continuously, or periodically, or intermittently, irrespective of any other process steps that may be carried out, in order to guarantee that cellular communication is indeed deactivated according to the user's defined events and/or conditions, and restored whenever these conditions and/or events are not satisfied. In some other embodiments, wherein deactivation of the cellular communication is performed upon receipt of a respective user input (10*i*), and if the user did not define any deactivation conditions and/or events, step U5 merely includes monitoring and identifying such respective user input (10*i*).

If it is determined in step U5 that the deactivation conditions/events are satisfied, in steps U6 and U7 the communication manager module (10*m*) sends the enrolled contacts a deactivation notification N3, indicating that cellular communication of the user's cellular phone device (10) is being disabled, and cellular communication unit (10*u*) of the phone device (10) is switched into the inactive state. In some embodiments the deactivation notification N3 includes instructions for the call manager module (10*a*) running in the cellular phone device of the enrolled contacts about how to restore cellular communication with the user's cellular phone device (10) and which alternative communication channels can be used for this purpose.

Steps U6 and U7 may be performed concurrently, or one after the other in any suitable order. In some embodiments step U6 is performed before cellular communication is disabled in step U7, in order to permit the communication manager module (10*m*) to send the deactivation notification N3 to the enrolled entities/contact persons over the cellular network (13). In other possible embodiments cellular communication of the user's phone device (10) is disabled immediately upon determining that the deactivation conditions/events are satisfied i.e., step U7 is performed immediately after step U5, and the deactivation notification N3 is sent by the communication manager module (10*m*) after cellular communication of the phone device (10) has been disabled (i.e., step U6 is performed after step U7) over an alternative communication channel e.g., over the Internet via the WLAN connectivity.

In step U8 the communication manager module (10*m*) enters a wait state in which it listens to one or more alternative communication channels i.e., that do not require cellular communication, and checks if requests N4 to restore cellular communication are received from the enrolled contacts. Optionally, in possible embodiments, the activation requests N4 are sent whenever a call is initiated from the phone device of the enrolled contact to the user, regardless of whether a deactivation notification N3 was received or was not received by the phone device of the enrolled contact.

Upon receipt of the deactivation notification N3 in the cellular phone device (10(*i*)) of an enrolled contact, in step C2 the call manager module (10*a*) running in the cellular phone device processes and registers the deactivation notification N3, and then enters a call arbitration mode in which the call manager module (10*a*) intercepts any attempt to establish cellular communication (e.g., voice call, video call, SMS and/or other messaging service) with the cellular phone device (10) whose cellular communication as been disabled.

Whenever the call manager module (10*a*) intercepts in step C3 an attempt to establish cellular communication with a cellular phone device (10) whose cellular communication as been disabled, in step C4 the call manager module halts the cellular communication attempt and sends an activation request N4 to the cellular phone device (10) whose cellular communication as been disabled. The activation request N4 is sent to the user's cellular phone device (10) using any suitable alternative communication channel. In some embodiments, the activation request N4 is sent by the call manager module (10*a*) over the same communication channel used to submit the deactivation notification N3. In some other possible embodiments, if the deactivation notification N3 received from the user's phone device (10) included instructions about how to restore cellular communication therewith, the call manager module (10*a*) selects for the activation request N4 any (or all) suitable alternative communication channel(s) specified in the instructions provided in the deactivation notification N3.

After sending the activation request N4 the call manager module (10*a*) enters a wait state in step C5 until a notification is received that cellular communication of the user's cellular phone device (10) has been restored. Optionally, and in some embodiments preferably, in step C5 the call manager displays a respective notification (and/or provides any other suitable visual and/or audio indication) in the display of the phone device of the enrolled contact, to indicate that the process of restoring cellular communication with the user's phone device is being carried out.

The activation request N4 is received and processed by the communication manager module (10*m*) in step U8, wherein it is determined whether cellular communication of the user's cellular phone device is to be restored. In some embodiments the communication manager module (10*m*) is configured to also verify that the activation request N4 is received from a cellular phone device of an enrolled user, before passing the control to step U9. If it is determined in step U8 that cellular communication is needed by an enrolled contact, in step U9 the communication manager module (10*m*) switches the cellular communication unit (10*u*) into the active state, and in step U10 sends an activation notification N5 (e.g., via email, SMS or any other messaging service) to at least the cellular phone device of the enrolled contact from which the activation request N4 has been sent. Optionally, the activation notification N5 is sent to the cellular phone devices of all enrolled contacts.

In some embodiments performing step U9 after step U10 enables the communication manager module (10m) to send the activation notification N5 to the cellular phone device of the enrolled contact(s) over the cellular network immediately after cellular communication of the cellular phone device (10) is restored. Optionally, submission of the activation notification N5 in step U10 is performed before cellular communication is restored in step U9, and in this case the activation notification N5 is sent to the cellular phone device of the enrolled contact(s) over at least one of the alternative communication channels, preferably, over a data network (the Internet) using WLAN connectivity. In some possible embodiments, the communication manager module (10m) is configured to submit the activation notification N5 over the same communication channel used by the call manager module (10a) to send the activation request N4.

In some embodiments the determination in step U8 whether to restore cellular communication comprises indicating on the user's phone display (not shown) details of the received activation request, and requesting the user's approval to activate the cellular communication unit (10u) to allow cellular communication with the enrolled contact that requested it. Optionally, the determination in step U8 comprises processing priorities defined by the user (19) to at least some of the enrolled contacts, and/or by processing priority information provided by the call manager module (10a) in the activation request N4.

After receiving the activation notification N5 in step C5, the call manager module (10a) releases the intercepted call attempt, and in step C6 permits initiation N6 of point-to-point cellular communication with the user's cellular phone device (10). In some embodiments, the call manager module (10a) is configured to verify that the activation notification N5 was indeed received from the user's cellular phone device (10), before passing the control to step C6. In step U11 the user (19) permits cellular communication initiation N6 of the enrolled contact (10(i)), and cellular communication is established therebetween.

Figure 3A:
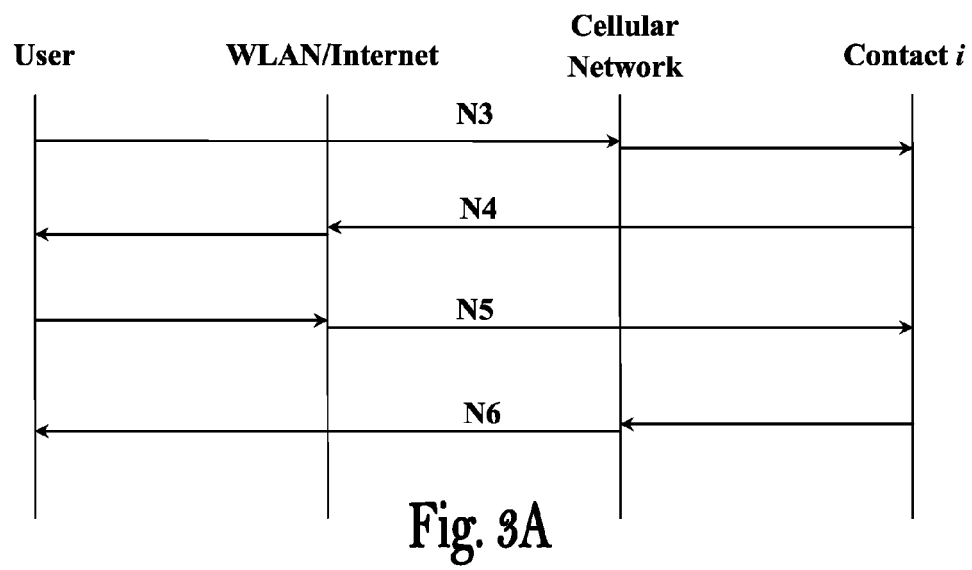
FIGS. 3A to 3C are sequence diagrams schematically illustrating operation of the communication control scheme according to some possible embodiments.
Figure 3B:
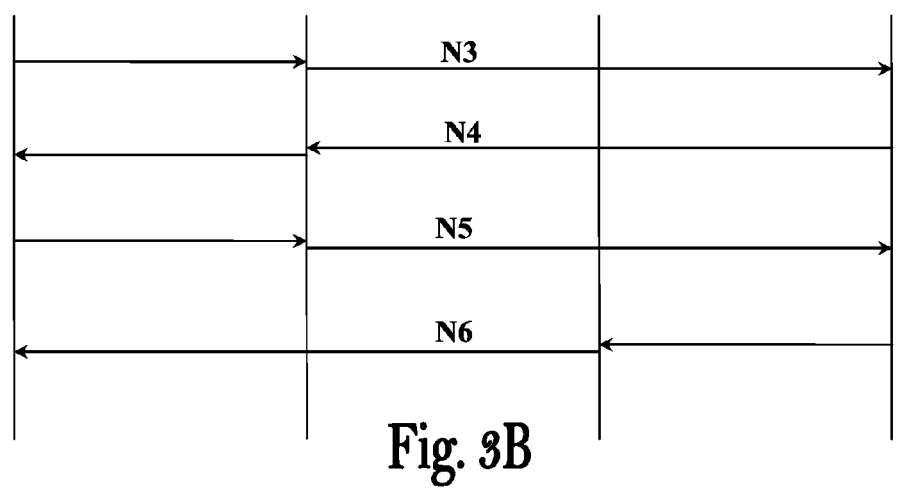
Figure 3C:
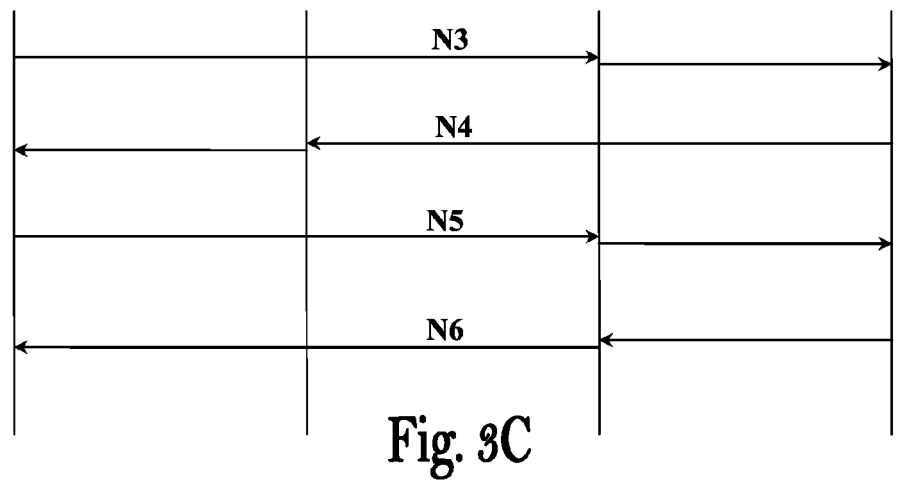

FIGS. 3A to 3C are sequence diagrams schematically illustrating possible communication sequences between the communication manager module (10m) running in the user's cellular phone device (10) and the call manager module (10a) running in a cellular phone device (10(i)) of an enrolled contact. FIG. 3A illustrates possible embodiments wherein the deactivation notification N3 is sent to enrolled contacts over the cellular network (13), the activation request N4 is sent to the user's device (10) over the Internet via WLAN connectivity of the phone devices, and the activation notification N5 is sent to the enrolled contact over the Internet via the WLAN connectivity of the phone devices. FIG. 3B illustrates possible embodiments wherein the deactivation notification N3, the activation request N4, and the activation notification N5, are all sent over the Internet via WLAN connectivity of the phone devices. FIG. 3C illustrates possible embodiments wherein the deactivation notification N3 is sent to enrolled contact over the cellular network (13), the activation request N4 is sent to the user's device (10) over the Internet via the WLAN connectivity of the phone devices, and the activation notification N5 is sent to the enrolled contact over the cellular network (13). It is however noted that other communication sequences are also possible, and that the invention is not limited to these specific examples.

In addition, as explained hereinabove, other alternative communication channels (e.g., SATCOM) may be similarly used to communicate the notifications/requests between the phone devices, instead of (or in addition to) the WLAN connectivity of the phone devices.

A major advantage of the communication control scheme of the present invention is in that it provides control over the cellular connectivity of users' cellular phone devices without cooperation and/or intervention of the cellular service providers, and without requiring any modifications and/or adjustments of the existing cellular infrastructures, thus being immediately applicable worldwide upon any cellular infrastructure.

In some embodiments the communication manager module 10m in the user's cellular phone device 10 is configured to periodically check that an active data/computer network (Internet) connection exists via an alternative wireless communication channel, such as provided via the WLAN communication unit 10w. If it is realized that the cellular phone device is disconnected from the data/computer network 15 for some predefined period of time, the communication manager module 10m activates the cellular communication unit 10u in order to restore cellular communication, and sends a respective activation notification N5 to the enrolled contacts.

In some embodiments the control unit 10t is configured to automatically activate the communication manager module 10m at predefined times and/or at specific locations (e.g., at home or at work), where wireless connectivity is readily available. Optionally, the control unit 10t is configured to automatically stop execution of the communication manager module 10m at predefined times (e.g., daily working times) and/or at locations (e.g., highways) where wireless connectivity is typically not available.

Figure 4A:
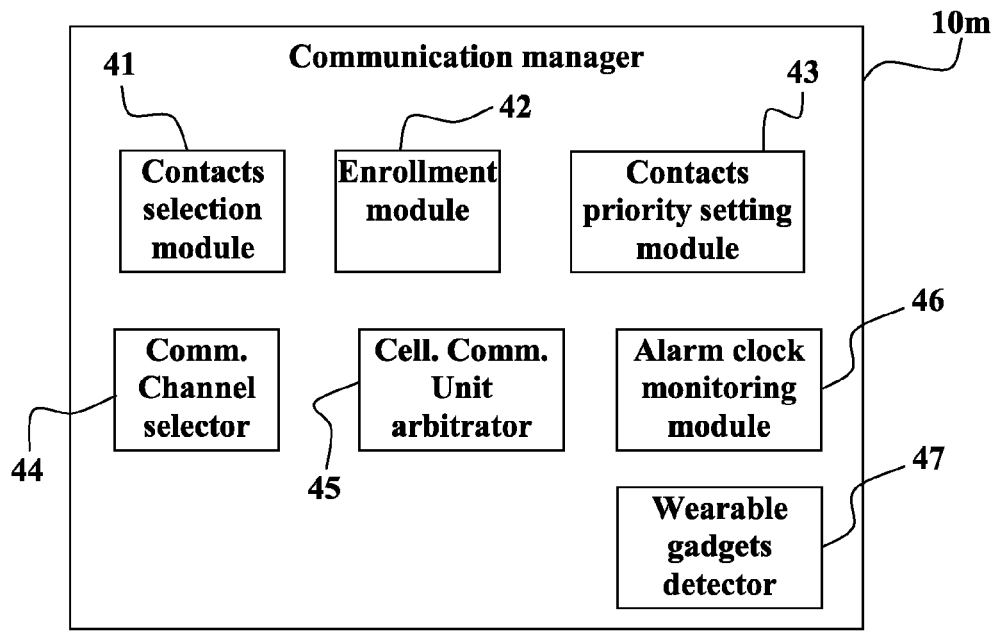
FIGS. 4A and 4B are block diagrams showing module blocks of the cellular communication manager and call manager modules, respectively, according to some possible embodiments.

FIG. 4A shows module blocks used in the cellular communication manager module 10m in some possible embodiments. In this non-limiting example a contacts selection module 41 is used in the communication manager module 10m to manage selection of the contacts from the contacts dataset (11) of user's cellular phone device. The contacts selection module 41 can be configured to present to the user (19) of the cellular phone device (10) the contacts in the contacts dataset (11), and receive user inputs indicating the selected contacts to which notifications on the state of the cellular communication unit (10u) are to be sent, and register the contacts selected by the user for future use.

The enrollment module 42 can be used to manage transmission of enrollment invitations (N1) to the contacts selected by the user, as registered by the contacts selection module 41. The enrollment module 42 can be configured to send enrollment invitations to the selected contact, and receive and record the enrollment confirmations (N2) sent from the cellular phone devices of the enrolled contacts. The enrollment module 42 can be further configured to notify the contacts selection module 41 about selected contacts who did not send back enrollment confirmations (N2), for further consideration and possibly removal from the selected contacts registered therein.

The contacts priority setting module 43 can be used to allow the user (19) to set priority levels to the selected contacts registered in the contacts selection module 41. The priority levels set by the user define the importance of each selected contact to the user, and can be then used in some embodiments in decision making processes for determining whether to activate the cellular communication unit in response to activation requests from the selected contacts. In this case, in certain situations the communication manager module 10*m* can decide to permit activation of cellular communication unit only when receiving activation requests from selected contacts having high priority level settings.

The cellular communication unit arbitrator 45 is used for changing the state of the cellular communication unit between active and inactive states. In some embodiments the cellular communication unit arbitrator 45 is further configured to apply only partial deactivation of the cellular communication unit by deactivating only the cellular transmitter of the cellular communication unit (e.g., if the ability to listen to the control channels of the cellular network should be maintained). However, if power saving becomes (or is defined to be) of higher priority, the cellular communication unit arbitrator 45 fully deactivates the cellular communication unit by deactivating both the cellular transmitter and receiver of the unit of the cellular communication unit.

The communication manager 10*m* can further utilize a communication channel selector module 44 configured to check the availability and reliability of alternative communication channels, and select based thereon at least one alternative communication channel to be used by the communication manager module 10*m* for transmission of the deactivation and activation notifications (N3 and N5).

In some embodiments the communication manager module 10*m* utilizes an alarm clock monitoring module 46 configured to monitor morning alarm times set by the user in the clock application of the cellular phone device 10, used to automatically restore cellular communication several minutes prior to, or exactly at, the set wakeup time.

Optionally, and in some embodiments preferably, the communication manager module 10*m* utilizes a wearable gadgets detector module 47 configured to monitor and identify wearable gadgets, such as, but not limited to, a smart watch, to thereby automatically determine wake or sleep states of the user (using heart rate monitoring functions of such gadgets), and adjusting the activation and deactivation of the cellular communication unit accordingly.

In some embodiments the communication manager module 10*m* is configured to provide a "periscope" mode of operation allowing the user to receive calls from non-enrolled entities/contacts, and/or out of phonebook numbers, and/or from unrecognized phone numbers (collectively referred to herein as unexpected calls). In this mode of operation the cellular communication unit arbitrator 45 is configured to periodically (or intermittently) restore cellular communication of the cellular phone device 10 for a short interval of time (e.g., once every hour), thereby enabling cellular message reception of unexpected calls made during the time period in which cellular communication was disabled. Advantageously, this mode of operation can substantially improve power saving and enhance battery usage times of the cellular phone device. This mode of operation can be also advantageous for use during working hours for reducing exposure to electromagnetic radiation during work time.

It is understood that the communication control scheme of the present invention can significantly improve power saving of cellular phone devices. It is thus can be advantageous to include the communication manager module 10*m* as an option for enhanced battery saving mode, allowing to automatically deactivate the cellular communication unit/transmitter and thereby reduce energy consumption when the battery of the phone device reaches a "Low Battery" percentage/state (but only if an alternative communication channel is available for receiving activation requests).

Figure 4B:
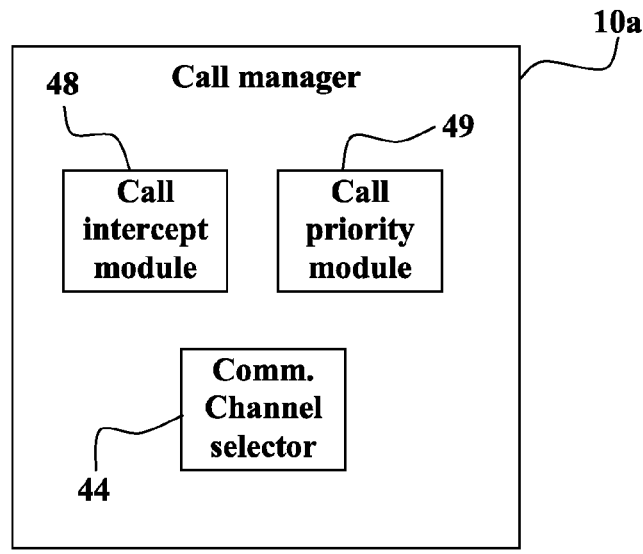

FIG. 4B shows module blocks used in the call manager module 10*a* in some possible embodiments. In this non-limiting example a call intercept module 48 is used by the call manager module 10*a* when it is switched into the call arbitration mode. The call intercept module 48 is configured to check any attempt of the selected contact to initiate a telephone call, and halt the telephone call initiation process if the selected contact tries to call a user whose cellular communication been disabled. The call intercept module 48 is further configured to release the halted telephone call initiation process upon receiving the activation notification N5 from the respective user.

A call priority module 49 can be used by the call manager module 10*a* to receive priority settings (e.g., most urgent, urgent, not urgent) from the user when requesting activation of cellular communication unit of a cellular phone device of a user. The call priority module 49 is thus configured to insert into the activation request (N4) the priority settings defined by the selected contact person. A communication channel selector module 44 can be also used by the call manager module 10*a* to check the availability and reliability of alternative communication channels, and select, based thereon, at least one alternative communication channel for transmission of the activation requests (N4).

It is anticipated that widespread adoption of the communication control scheme of the present invention will substantially reduce emission of electromagnetic radiation and energy consumption of cellular node transmitters (base stations/Operators "Cell Towers"), particularly during night time. Thus, radiation reduction will be synergistically amplified. In addition, due to the short range properties of WLAN/WiFi communication it consumes substantially less energy and thus incremental power saving is achieved. The reduction of energy consumption achieved through the use of the communication control scheme disclosed herein will extend battery life, and the reduction of energy consumption shall provide a shorter battery charging time.

Throughout this disclosure, where a process or method is shown or described, the steps of the method may be performed in any order or simultaneously, unless it is clear from the context that one step depends on another being performed first.

It is appreciated that functions of the communication control and call manager modules described hereinabove may be controlled through software instructions executed by a computer-based control unit/system integrated in the cellular phone devices. A control unit/system suitable for use with embodiments described hereinabove may include, for example, one or more processors connected to a communication bus, one or more volatile memories (e.g., random access memory—RAM) or non-volatile memories (e.g., Flash memory). A secondary memory (e.g., a hard disk drive, a removable storage drive, and/or removable memory chip such as an EPROM, PROM or Flash memory) may be used for storing data, computer programs or other instructions, to be loaded into the control unit/system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

For example, computer programs (e.g., computer control logic) may be loaded from the secondary memory into a main memory for execution by one or more processors of the control unit/system. Alternatively or additionally, computer programs may be received via a communication interface. Such computer programs, when executed, enable the computer system to perform certain features of the present invention as discussed herein. In particular, the computer programs, when executed, enable a control processor to perform and/or cause the performance of features of the present invention. Accordingly, such computer programs may implement controllers of the computer system.

In an embodiment where the invention is implemented using software, the software can be stored in a computer program product and loaded into the computer system using the removable storage drive, the memory chips or the communications interface. The control logic (software), when executed by a control processor, causes the control processor to perform certain functions of the invention as described herein.

In other possible embodiments, features of the invention are implemented primarily in hardware using, for example, hardware components such as application specific integrated circuits (ASICs) or field-programmable gated arrays (FPGAs). Implementation of a hardware state machine to perform the functions described herein will be apparent to persons skilled in the relevant art(s). In yet another possible embodiment, features of the invention can be implemented using a combination of both hardware and software.

As described hereinabove and shown in the associated figures, the present invention provides cellular communication system and cellular communication control schemes, and related methods and software/hardware implementations thereof, allowing users to control the emission of electromagnetic radiation from their cellular phone devices. While particular embodiments of the invention have been described, it will be understood, however, that the invention is not limited thereto, since modifications may be made by those skilled in the art, particularly in light of the foregoing teachings. As will be appreciated by the skilled person, the invention can be carried out in a great variety of ways, employing more than one technique from those described above, all without exceeding the scope of the invention.

The invention claimed is:

1. A cellular communication system capable of establishing cellular communication between a plurality of cellular communication devices over a cellular communication network,
   wherein one or more of said cellular communication devices are configured to eliminate emission of electromagnetic radiation of cellular communication therefrom responsive to a user input, and
   wherein each of said plurality of cellular communication devices comprises:
   cellular communication unit configured and operable to communicate with and through said cellular communication network,
   a wireless data communication unit configured and operable to communicate with and through a data network to allow said cellular communication device to communicate a command over an alternative communication channel not involving cellular communication whenever cellular communication of said cellular communication unit is stopped, and
   a control processor configured and operable to operate said cellular communication device and receive said user input indicating that the cellular communication of said cellular communication device is to be stopped,
   said processor comprising a communication manager module configured and operable to carry out the following actions in response to said user input:
   send a deactivation notification, through at least one of said cellular and said wireless data communication units, to at least one other cellular communication device of another user whom been preselected by said user of said cellular communication device, to inform about deactivation of its cellular communication unit;
   deactivate said cellular communication unit to stop the cellular communication of the device and eliminate the emission of the electromagnetic radiation of cellular communication therefrom until receipt of an activation request in a command sent over said alternative communication channel from at least one of the preselected cellular communication devices; and
   activate said cellular communication unit upon receiving over said data network on said alternative channel, said activation request from said at least one of the preselected cellular communication devices indicating that cellular communication with said at least one of the preselected cellular communication devices is required.

2. The system of claim 1, wherein the communication manager module is configured and operable to send an activation notification to the at least one of the preselected cellular communication devices through at least one of the cellular and wireless data communication units.

3. The system of claim 2, wherein the communication manager module is configured and operable to send the activation notification through the wireless data communication unit upon receipt of the activation request and concurrently activate its cellular communication unit.

4. The system of claim 2, wherein the communication manager module is configured and operable to send the activation notification through the cellular communication unit after activation of its cellular communication unit.

5. The system of claim 1, wherein the processor of the preselected cellular communication devices comprises a call manager module configured and operable to receive and process the deactivation notification by said preselected cellular communication devices of the other users and responsively intercept and halt attempts to initiate cellular communication with the cellular communication device whose cellular communication unit been deactivated.

6. The system of claim 5, wherein the call manager module is configured and operable to send to the cellular communication device whose cellular communication unit been deactivated, the activation request via its wireless data communication unit to request activation of the cellular communication unit of the cellular communication device whose cellular communication unit been deactivated, whenever cellular communication therewith is required.

7. The system of claim 5, wherein the call manager module is configured and operable to receive and process an activation notification from the cellular communication device whose cellular communication unit been deactivated and responsively release the intercepted attempts for cellular communication therewith.

8. The system of claim 1, wherein the data network is the Internet and wherein the connectivity to the Internet is obtained via WLAN connectivity of the wireless data communication units of the cellular communication devices.

9. The system of claim 1, wherein the communication manager module is configured and operable to send the deactivation notification and deactivate the cellular communication unit, upon fulfillment of events or conditions defined by the user of the device.

10. The system of claim 1, wherein the communication manager module is configured and operable to deactivate only a cellular transmitter of the cellular communication unit.

11. The system of claim 1, wherein the communication manager module is configured and operable to deactivate a transmitter and a receiver of the cellular communication unit.

12. The system of claim 1, wherein the wireless data communication unit is configured and operable to exchange data with the at least one of the preselected cellular communication devices over satellite communication.

13. A method of stopping emission of cellular communication electromagnetic radiation from a cellular communication device having a cellular communication unit configured and operable to communicate with and through a cellular communication network and a wireless data communication unit configured and operable to communicate with and through a data network to allow said cellular communication device to communicate a command over an alternative communication channel not involving cellular communication whenever cellular communication of said cellular command unit is stopped, the method comprising:
  receiving a user input indicating that emission of said cellular communication of said cellular communication device is to be stopped;
  sending a deactivation notification to at least one other cellular communication device of another user, that been preselected by said user, through at least one of said cellular and wireless data communication units, to inform that cellular communication of said cellular communication device is being disabled;
  deactivating said cellular communication unit to stop the cellular communication of the device and eliminate the emission of the electromagnetic radiation of cellular communication therefrom; and
  receiving through said wireless communication unit an activation request in a command sent over said alternative communication channel from at least one of the cellular communication devices of the preselected users, and responsively activating said cellular communication unit.

14. The method of claim 13, further comprising sending an activation notification to the at least one other cellular communication device of the preselected user, either via the wireless data communication unit, upon receipt of the activation request, or via the cellular communication unit, shortly after activating the cellular communication unit of the cellular communication device.

15. The method of claim 14, further comprising establishing cellular communication with the at least one other cellular communication device of the preselected user.

16. The method of claim 14, further comprising receiving from the user priority indications for at least one of the selected contact persons, wherein the method comprises associating the received activation request with one of said selected contact persons and deciding whether to activate the cellular communication unit based on said priority indications.

17. The method of claim 13, comprising monitoring user defined conditions or events, and sending the deactivation notification and deactivating the cellular communication unit, upon fulfillment of one of said user defined conditions or events.

18. The method of claim 13, wherein the user defined conditions or events comprises charging a battery of the device.

19. The method of claim 13, wherein the sending of the deactivation notification comprises inserting into said deactivation notification instructions for the at least one other preselected cellular communication device indicating a communication channel to be used for sending the activation request in order to restore cellular communication with the cellular communication device.

20. The method of claim 13, further comprising receiving from a user of the cellular communication device data indicative of selected contact persons, wherein the at least one other preselected cellular communication device is a cellular communication device of at least one of said selected contact persons.

21. The method of claim 20, further comprising sending to cellular communication devices of the selected contact persons an enrollment invitation informing them about their selection by the user, and receiving an enrollment confirmation from one or more of said cellular communication devices.

22. The method of claim 21, wherein the enrollment invitation is configured to cause installation of a call manager module in the cellular communication devices of the selected contact persons, said call manager module is configured and operable to receive the deactivation notification and send the activation request through the wireless data communication unit.

23. The method of claim 21, wherein the call manager module is configured to include in the activation request a priority indication, and wherein the method comprises sending the activation request with said priority indication to the cellular communication device whose cellular communication unit been deactivated, and deciding in said device whether to activate the cellular communication unit based on said priority indication.

24. A computer application comprising instructions stored on a non-transitory computer-readable medium, said instructions executable by a processor of a cellular communication device to cause said processor to stop emission of cellular communication electromagnetic radiation from said cellular communication device responsive to a user input, by carrying out the following operations:
  receiving a user input indicating that emission of said cellular communication electromagnetic radiation by said cellular communication device is to be stopped;
  sending a deactivation notification to at least one other cellular communication device of another user that has been preselected by said user of said cellular communication device, through at least one of a cellular and wireless data communication units of said cellular communication device, to inform that cellular communication of said cellular communication device is being disabled;
  deactivating said cellular communication unit to stop the cellular communication of the device and eliminate the emission of the electromagnetic radiation of cellular communication therefrom; and
  receiving, through said wireless data communication unit, while cellular communication of said cellular communication device is disabled, the activation request in a command sent from at least one of the cellular communication devices of the preselected users over an alternative communication channel not involving cellular communication, and responsively activating said cellular communication unit.

25. The computer application of claim 24, further comprising executable instructions configured to cause the processor to send an activation notification to the at least one other preselected cellular communication device, either via the wireless data communication unit, upon receipt of the activation request, or via the cellular communication unit, shortly after, activating the cellular communication unit.

26. The computer application of claim 24, further comprising executable instructions configured to cause said processor to monitor user defined conditions or events, and send the deactivation notification and deactivate the cellular communication unit, upon fulfillment of at least one of said user defined conditions or events.

27. The computer application of claim 24, further comprising executable instructions configured to cause the processor to include in the deactivation notification instructions for the at least one other preselected cellular communication device indicating a communication channel to be used for sending the activation request in order to restore cellular communication with the cellular communication device.

28. The computer application of claim 24, further comprising executable instructions configured to cause the processor to receive from a user of the cellular communication device data indicative of selected contact persons, and to send the deactivation notification to a cellular communication device of at least one of said selected contact persons.

29. The computer application of claim 28, further comprising executable instructions configured to cause the processor to send to each cellular communication device of the selected contact persons an enrollment invitation informing about their selection by the user, said enrollment invitation being configured to cause the processor of the cellular communication device of the selected contact person to install a call manager module in the cellular communication device for receiving the deactivation notification and for sending the activation request through the wireless communication unit.

30. The computer application of claim 24, further comprising executable instructions configured to cause the processor to receive from the user priority indications for at least one of the selected contact persons, associate the received activation request with one of said selected contact persons, and decide whether to activate the cellular communication unit based on the priority indications associated with said at least one of the selected contact persons.

* * * * *